United States Patent
Mauk et al.

(10) Patent No.: US 8,942,854 B2
(45) Date of Patent: Jan. 27, 2015

(54) SYSTEM AND METHOD FOR IDENTIFYING ELECTRICAL DEVICES IN A POWER MANAGEMENT SYSTEM

(75) Inventors: Richard A. Mauk, Sheboygan, WI (US); Edward Douglas Brey, Sheboygan Falls, WI (US); William Herman Gross, Oostburg, WI (US); Gary Allen Kroll, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 462 days.

(21) Appl. No.: 13/305,104

(22) Filed: Nov. 28, 2011

(65) Prior Publication Data

US 2013/0138258 A1 May 30, 2013

(51) Int. Cl.
*G06F 19/00* (2011.01)
*G05B 11/01* (2006.01)
*G06F 1/26* (2006.01)

(52) U.S. Cl.
CPC . *G05B 11/01* (2013.01); *G06F 1/26* (2013.01)
USPC ............. 700/295; 700/286; 700/297; 700/22; 375/310; 340/870.02

(58) Field of Classification Search
CPC ............... G05B 11/01; H02J 3/14; G06F 1/26
USPC .................... 700/295, 286, 297, 22; 375/310; 340/870.02
See application file for complete search history.

(56) References Cited

U.S. PATENT DOCUMENTS

| | | | |
|---|---|---|---|
| 4,031,406 A | 6/1977 | Leyde et al. | |
| 4,034,233 A | 7/1977 | Leyde | |
| 4,064,485 A | 12/1977 | Leyde | |
| 4,099,067 A | 7/1978 | Szentes et al. | |
| 4,639,657 A | 1/1987 | Frierdich | |
| 4,701,690 A | 10/1987 | Fernandez et al. | |
| 4,731,547 A | 3/1988 | Alenduff et al. | |
| 4,800,291 A | 1/1989 | Bowers | |
| 5,294,879 A | 3/1994 | Freeman et al. | |
| 5,414,640 A | 5/1995 | Seem | |
| 5,422,517 A | 6/1995 | Verney et al. | |
| 5,604,421 A | 2/1997 | Barnsley | |
| 5,640,060 A | 6/1997 | Dickson | |
| 5,684,710 A | 11/1997 | Ehlers et al. | |
| 5,761,073 A | 6/1998 | Dickson | |
| 5,861,683 A | 1/1999 | Engel et al. | |
| 5,880,537 A | 3/1999 | Windhorn | |
| 6,104,171 A | 8/2000 | Dvorsky et al. | |
| 6,107,927 A | 8/2000 | Dvorsky et al. | |

(Continued)

FOREIGN PATENT DOCUMENTS

WO    WO 2010025307 A1 *  3/2010

*Primary Examiner* — Michael D Masinick
(74) *Attorney, Agent, or Firm* — Schwegman Lundberg & Woessner, P.A.

(57) ABSTRACT

Some embodiments relate to a method of identifying electrical devices in a power management system. The method includes accessing a controller using a server that includes identifiers of the electrical devices. The controller is electrically connected (directly or indirectly) to the electrical devices. The method further includes exchanging data between the server and the controller to correlate the identifiers with the electrical devices. The potential identifiers that may be used to correlate the identifiers with the electrical devices may be stored in an identifier database on the server. In some embodiments, the identifiers of the electrical devices may also be stored in an identifier database on the controller.

26 Claims, 4 Drawing Sheets

(56) References Cited

U.S. PATENT DOCUMENTS

| | | | |
|---|---|---|---|
| 6,163,088 A | 12/2000 | Codina et al. | |
| 6,172,432 B1 | 1/2001 | Schnackenberg et al. | |
| 6,191,500 B1 | 2/2001 | Toy | |
| 6,552,888 B2 | 4/2003 | Weinberger | |
| 6,631,310 B1 | 10/2003 | Leslie | |
| 6,653,821 B2 | 11/2003 | Kern et al. | |
| 6,657,416 B2 | 12/2003 | Kern et al. | |
| 6,668,629 B1 * | 12/2003 | Leslie | 73/114.01 |
| 6,686,547 B2 | 2/2004 | Kern et al. | |
| 6,739,145 B2 | 5/2004 | Bhatnagar | |
| 6,747,368 B2 | 6/2004 | Jarrett, Jr. | |
| 6,798,187 B1 | 9/2004 | Czarnecki | |
| 6,801,019 B2 | 10/2004 | Haydock et al. | |
| 6,833,694 B2 | 12/2004 | Ikekame | |
| 6,876,103 B2 | 4/2005 | Radusewicz | |
| 6,912,889 B2 | 7/2005 | Staphanos et al. | |
| 6,983,640 B1 | 1/2006 | Staphanos et al. | |
| 7,015,599 B2 | 3/2006 | Gull | |
| 7,053,497 B2 | 5/2006 | Sodemann et al. | |
| 7,133,787 B2 | 11/2006 | Mizumaki | |
| 7,146,256 B2 | 12/2006 | Hibi et al. | |
| 7,149,605 B2 | 12/2006 | Chassin et al. | |
| 7,177,612 B2 | 2/2007 | Nakamura et al. | |
| 7,177,728 B2 | 2/2007 | Gardner | |
| 7,208,850 B2 | 4/2007 | Turner | |
| 7,218,998 B1 | 5/2007 | Neale | |
| 7,230,345 B2 | 6/2007 | Winnie et al. | |
| 7,239,045 B2 | 7/2007 | Lathrop | |
| 7,245,036 B2 | 7/2007 | Endou et al. | |
| 7,274,974 B2 | 9/2007 | Brown | |
| 7,336,003 B2 | 2/2008 | Lathrop et al. | |
| 7,345,456 B2 | 3/2008 | Gibbs et al. | |
| 7,356,384 B2 | 4/2008 | Gull et al. | |
| 7,446,425 B2 | 11/2008 | Sato | |
| 7,521,822 B2 | 4/2009 | Lorenz | |
| 7,557,544 B2 | 7/2009 | Heinz et al. | |
| 7,573,145 B2 | 8/2009 | Peterson | |
| 7,579,712 B2 | 8/2009 | Yanagihashi et al. | |
| 7,582,986 B2 | 9/2009 | Folkers et al. | |
| 7,598,623 B2 | 10/2009 | Fattal et al. | |
| 7,608,948 B2 | 10/2009 | Nearhoof et al. | |
| 7,619,324 B2 | 11/2009 | Folken et al. | |
| 7,656,060 B2 | 2/2010 | Algrain | |
| 7,687,929 B2 | 3/2010 | Fattal | |
| 7,715,951 B2 | 5/2010 | Forbes, Jr. et al. | |
| 7,747,355 B2 | 6/2010 | Bulthaup et al. | |
| 7,778,737 B2 | 8/2010 | Rossi et al. | |
| 7,786,616 B2 | 8/2010 | Naden et al. | |
| 7,795,851 B2 | 9/2010 | Ye et al. | |
| 7,945,636 B2 * | 5/2011 | Nelson et al. | 709/217 |
| 8,260,471 B2 * | 9/2012 | Storch et al. | 700/295 |
| 2002/0029227 A1 * | 3/2002 | Multer et al. | 707/203 |
| 2003/0107349 A1 | 6/2003 | Haydock et al. | |
| 2004/0051515 A1 | 3/2004 | Ikekame | |
| 2004/0075343 A1 | 4/2004 | Wareham et al. | |
| 2005/0055337 A1 * | 3/2005 | Bebo et al. | 707/3 |
| 2005/0059373 A1 | 3/2005 | Nakamura et al. | |
| 2005/0063117 A1 | 3/2005 | Amano et al. | |
| 2005/0072220 A1 | 4/2005 | Staphanos et al. | |
| 2005/0097225 A1 * | 5/2005 | Glatt et al. | 709/248 |
| 2005/0116814 A1 | 6/2005 | Rodgers et al. | |
| 2005/0128659 A1 | 6/2005 | Hibi et al. | |
| 2005/0188745 A1 | 9/2005 | Staphanos et al. | |
| 2005/0216131 A1 | 9/2005 | Sodemann et al. | |
| 2006/0171523 A1 * | 8/2006 | Greenwell | 379/242 |
| 2006/0187600 A1 | 8/2006 | Brown et al. | |
| 2006/0203814 A1 | 9/2006 | Ye et al. | |
| 2006/0271688 A1 * | 11/2006 | Viger et al. | 709/227 |
| 2006/0284843 A1 | 12/2006 | Endou et al. | |
| 2007/0010916 A1 | 1/2007 | Rodgers et al. | |
| 2007/0067349 A1 * | 3/2007 | Jhaveri et al. | 707/200 |
| 2007/0120538 A1 | 5/2007 | Sato | |
| 2007/0129851 A1 | 6/2007 | Rossi et al. | |
| 2007/0222294 A1 | 9/2007 | Tsukida et al. | |
| 2007/0222295 A1 | 9/2007 | Wareham | |
| 2007/0288424 A1 * | 12/2007 | Neil | 707/2 |
| 2008/0157593 A1 | 7/2008 | Bax et al. | |
| 2008/0157600 A1 | 7/2008 | Marlenee et al. | |
| 2008/0313006 A1 * | 12/2008 | Witter et al. | 705/9 |
| 2009/0108678 A1 | 4/2009 | Algrain | |
| 2009/0113874 A1 | 5/2009 | McKee | |
| 2009/0152951 A1 | 6/2009 | Algrain | |
| 2009/0179498 A1 | 7/2009 | Lathrop et al. | |
| 2009/0195224 A1 | 8/2009 | Kim | |
| 2009/0198386 A1 | 8/2009 | Kim et al. | |
| 2009/0216386 A1 | 8/2009 | Wedel | |
| 2009/0234889 A1 * | 9/2009 | Dupree | 707/104.1 |
| 2009/0240377 A1 | 9/2009 | Batzler et al. | |
| 2009/0290270 A1 | 11/2009 | Ganev et al. | |
| 2010/0007313 A1 | 1/2010 | Jakeman et al. | |
| 2010/0019574 A1 | 1/2010 | Baldassarre et al. | |
| 2010/0038966 A1 | 2/2010 | Espeut, Jr. | |
| 2010/0039077 A1 | 2/2010 | Dalby | |
| 2010/0066551 A1 | 3/2010 | Bailey et al. | |
| 2010/0094475 A1 | 4/2010 | Masters et al. | |
| 2010/0100899 A1 * | 4/2010 | Bradbury et al. | 725/29 |
| 2010/0102637 A1 | 4/2010 | Dozier et al. | |
| 2010/0109344 A1 | 5/2010 | Conway et al. | |
| 2010/0148588 A1 | 6/2010 | Algrain | |
| 2010/0156117 A1 | 6/2010 | Allen | |
| 2010/0156191 A1 | 6/2010 | Dozier et al. | |
| 2010/0217837 A1 * | 8/2010 | Ansari et al. | 709/218 |
| 2010/0225167 A1 | 9/2010 | Stair et al. | |
| 2011/0109291 A1 | 5/2011 | Tang et al. | |
| 2011/0184581 A1 * | 7/2011 | Storch et al. | 700/295 |

* cited by examiner

SYSTEM AND METHOD FOR IDENTIFYING ELECTRICAL DEVICES IN A POWER MANAGEMENT SYSTEM

TECHNICAL FIELD

Embodiments pertain to a system and method of identifying electrical devices in a power management system, and more particularly to using a remote server to identify electrical devices in a power management system.

BACKGROUND

Some existing power management systems are able to label at least some of the electrical devices that are included in the power management system. This labeling is often done using an interface that is part of the controller which serves in part to operate the power management system. The data associated with labeling at least some of electrical devices within such power management systems is stored exclusively in the controller.

One of the drawbacks with these types of power management systems is that if the controller malfunctions, then the data associated with labeling the electric devices may be lost or damaged. This loss of data within the controller necessitates the manual reentry of labeling data into the controller.

Other existing power managements are sometimes able to enter data into the controller via a remote connection. One of the drawbacks with existing power management systems that enter electric device labeling data into the controller remotely is that the remote connection can be unsecure. Therefore, installers typically need to apply their own relatively expensive (and often customized) security wrappers to the power management systems.

Another drawback with existing power management systems that enter electric device labeling data into the controller remotely is that the labeling data is still only stored on the controller. Therefore, users of the power management systems are still required to reenter electric device labeling data when the electric device labeling data is lost on the controller.

The controllers in many existing power management systems can also be difficult to access remotely because such power management systems are typically located on private networks and cannot be accessed by public networks (e.g., the Internet) without some form of network administration. This need for further network administration is undesirable because they often require additional time, money and highly qualified personnel in order to set up the networking infrastructure.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
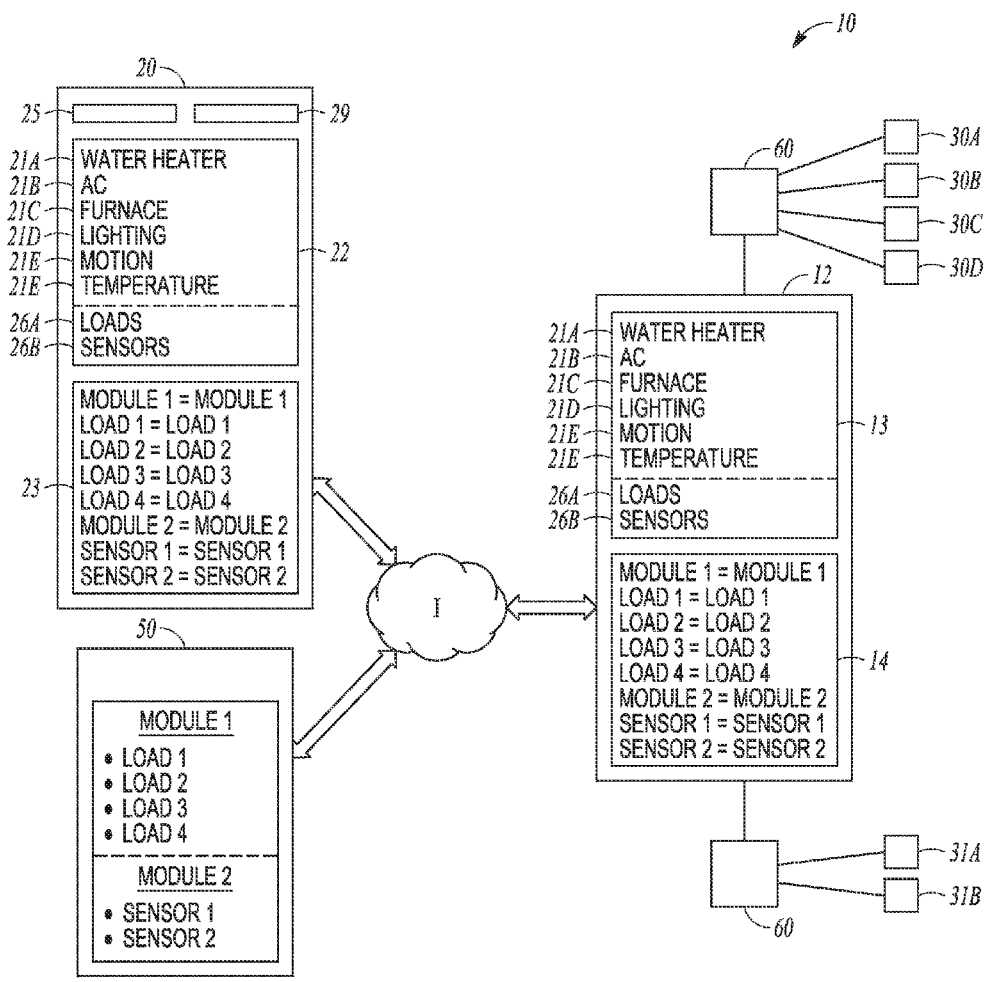
FIG. 1 illustrates a schematic diagram of an example power management system where the electrical devices that are included in the power management system are generically labeled.
Figure 2:
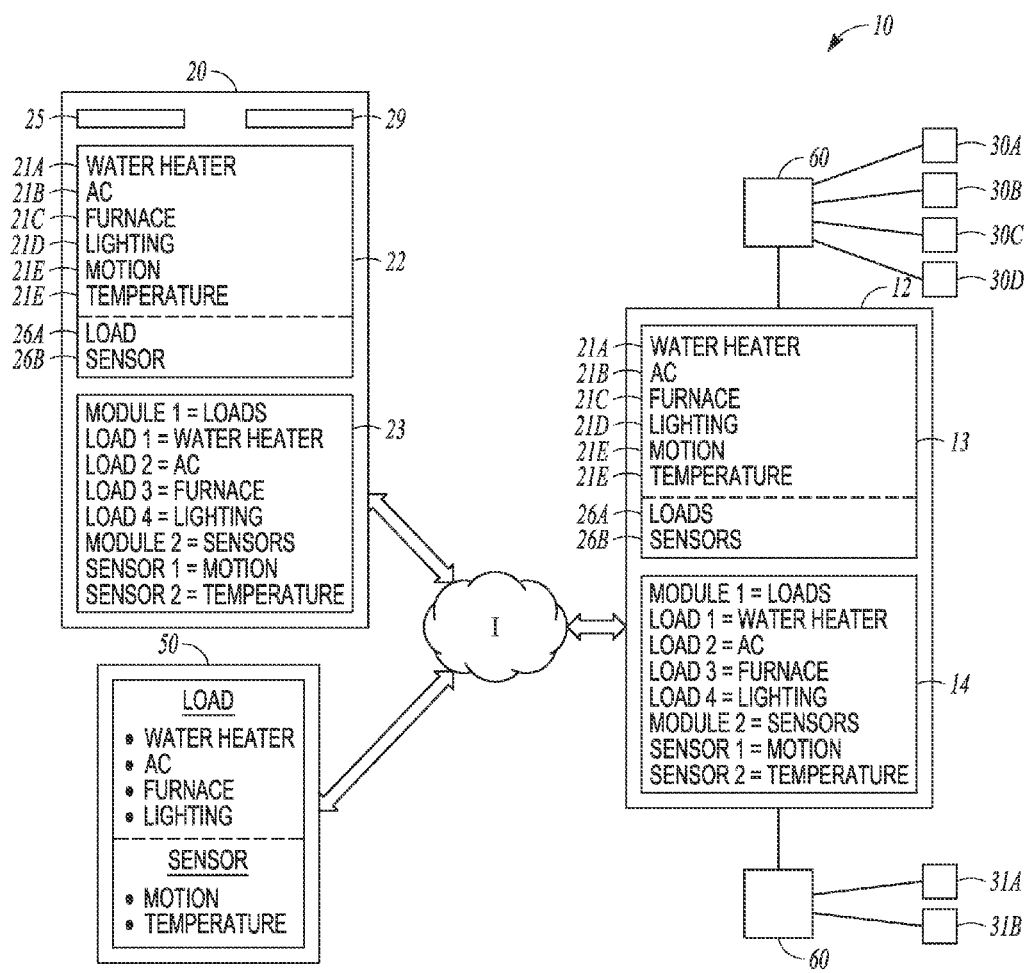
FIG. 2 illustrates the power management system shown in FIG. 1 where the electrical devices that are included in the power management system are labeled with identifiers.

A method of identifying electrical devices 30A-D, 31A-B in a power management system 10 will now be described with reference to FIGS. 1 and 2. The method includes accessing a controller 12 using a server 20 that includes identifiers 21A-F of the electrical devices 30A-D, 31A-B. The controller 12 is electrically connected (directly or indirectly) to the electrical devices 30A-D, 31A-B. The method further includes exchanging data between the server 20 and the controller 12 to correlate the identifiers 21A-F with the electrical devices 30A-D, 31A-B.

The potential identifiers 21A-F that may be used to correlate the identifiers 21A-F with the electrical devices 30A-D, 31A-B may be stored in an identifier database 22 on the server 20. In some embodiments, the identifiers 21A-F of the electrical devices 30A-D, 31A-B may also be stored in an identifier database 13 on the controller 12.

The method may further include (i) storing data related to the correlation of the identifiers 21A-F with the electrical devices 30A-D, 31A-B in a storage database 23 on the server 20; and/or (ii) storing data related to the correlation of the identifiers 21A-F with the electrical devices 30A-D, 31A-B in a database 14 on the controller 12. A comparison of FIG. 1 and FIG. 2 demonstrates the power management system 10 before the electrical devices 30A-D, 31A-B have been correlated with identifiers 21A-F (FIG. 1) and after the electrical devices 30A-D, 31A-B have been correlated with identifiers 21A-F (FIG. 2).

It should be noted that in these types of embodiments, exchanging data between the server 20 and the controller 12 to correlate the identifiers 21A-F with the electrical devices 30A-D, 31A-B may include (i) exchanging data when the server 20 recognizes a change in the storage database 14 on the controller 12; and/or (ii) exchanging data when the controller 12 recognizes a change in the storage database 23 on the server 20.

Figure 3:
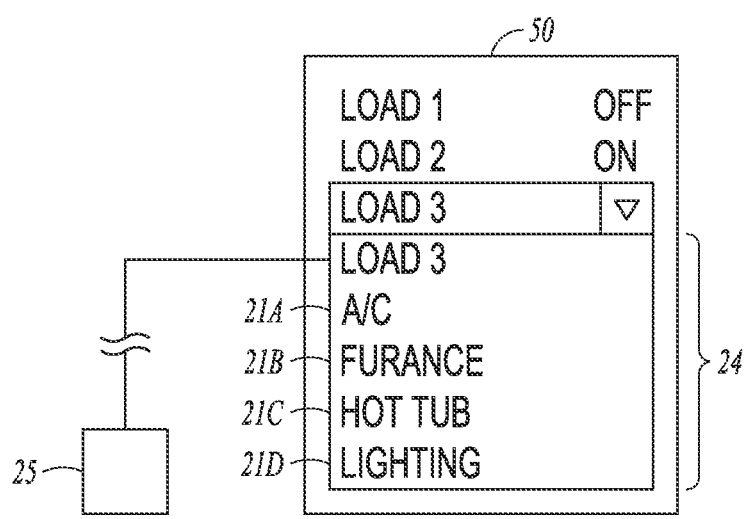
FIG. 3 illustrates a schematic diagram of an example user interface that may be used in the power management system shown in FIGS. 1 and 2.

The method may further include using an interface 50 to correlate the identifiers 21A-F with the electrical devices 30A-D, 31A-B. As shown in FIG. 3, using an interface 50 to correlate the identifiers 21A-F with the electrical devices 30A-D, 31A-B may include displaying a list 24 of identifiers 21A-21D for selection by a user of the interface 50.

It should be noted that the list 24 may include one, some or all of the identifiers 21A-F. In addition, the list 24 may include particular identifiers depending on the electrical device 30A-D, 31A-B to be labeled. As an example, the selection of an electrical device that is an electrical load 30A may pull up a list only load-related identifiers (see, e.g., load-related identifiers 21A-D in FIG. 3)

In addition, displaying a list 24 of identifiers 21A-F for selection by a user of the interface 50 may include retrieving the list 24 of identifiers 21A-F from a listing database 25 on the server 20. In some embodiments, the listing database 25 may store multiple lists such that the list 24 that is displayed on the user interface 50 will depend on which electrical device 30A-D, 31A-B is selected for correlation with an identifier. Embodiments are also contemplated where one or more of the lists 24 that are included in the listing database 25 are duplicated with the lists being in different languages.

There are a variety of interfaces 50 that may be used to correlate the identifiers 21A-F with the electrical devices 30A-D, 31A-B. As an example, the interface may be a personal computer or a portable electronic device (e.g., a mobile phone or a mobile tablet). Embodiments are contemplated where a user (i) enters an identifier manually; (ii) selects an identifier 21A-F from one of the identifiers 21A-F in database 22; or (iii) selects an identifier from one of the lists 24 provided in database 25.

In the illustrated example embodiments, the electrical devices 30A-D, 31A-B include electrical loads 30A-D such that the controller 12 selectively operates the electrical loads 30A-D. As shown in FIG. 3, the server 20 may include a list 24 of identifiers 21A-D for the electrical loads 30A-D. The illustrated example identifiers 21A-D of electrical loads 30A-D include water heater, air conditioner, furnace and lighting. It should be noted that any type of electrical load may be included in the power management system 10 with an appropriate identifier included in the identifier database 22 on the server 20 and possibly in the identifier database 13 on the controller 12.

In some embodiments, power management system 10 includes at least one load switching and sensor module 60 such that the identifier database 22 on the server 20 includes identifiers 26A-B of the load switching and sensor modules 60. In the example embodiment illustrated in FIGS. 1-2, the power management system 10 includes two load switching and sensor modules 60.

In the illustrated example embodiments, the electrical devices 30A-D, 31A-B further include sensors 31A-B such that the controller 12 receives data from sensors 31A-B. In addition, the identifier database 22 in the server 20 and possibly the identifier database 13 on the controller 12 include potential identifiers 21E-F of the sensors 31A-B that are connected to the controller 12.

As discussed above, the power management system 10 may include at least one load switching and sensor module 60. In the example embodiment illustrated in FIGS. 1-2, at least one of the sensors 31A-B delivers signals to the load switching and sensor module 60. In addition, the load switching and sensor module 60 may relay the signals to the controller 12. It should be noted that the storage database 14 on the controller 12 and/or the storage database 23 on the server 20 may include the correlated identifiers of one, some or all of the load switching and sensor modules 60.

In some embodiments, the controller 12 may be a generator controller that is configured to operate a generator. It should be noted that embodiments are also contemplated where the controller 12 serves as a load control module that is configured to selectively operate electrical loads 30A-D. In still other embodiments, the controller 12 may serve as an automatic transfer switch that is configured to switch between power sources (e.g., a generator and a utility power source).

Embodiments are also contemplated where the controller 12 serves as a load switching and sensor module similar to one of load switching and sensor modules 60 described above. Such a load switching and sensor module would be configured to operate electric loads 30A-D and receive input signals from sensors 31A-B.

In some embodiments, accessing the controller 12 using the server 20 includes creating a connection between the server 20 and controller 12. As an example, the controller 12 may store a predetermined address of the server 20 such that creating a connection between the server 20 and controller 12 includes using the controller 12 to initiate the connection with the server 20 at the predetermined address.

In embodiments where the power management system 10 includes an interface 50, the interface 50 may also store a predetermined address of the server 20 such that using the interface 50 to correlate the identifiers 21A-F with the electrical devices 30A-D, 31A-B includes using the interface 50 to initiate a connection with the server 20 at the predetermined address.

As an example, creating a connection between the server 20 and controller 12 may include using the interface 50 to provide a serial number of the controller 12 to the server 20. In embodiments where the interface 50 is used to provide a serial number of the controller 12 to the server 20, the server 20 may include a mapping database 29 that correlates the serial number of the controller 12 with a network address of the controller 12.

The methods described herein may permit labeling of electrical devices that are included in a power management system. The labeling may be done without the risk of losing identifier data within a controller because the identifier data is also stored on a server that communicates with the controller.

The methods may also allow a user to enter identifier data into the power management system via a remote connection. The identifier data may be entered remotely in a simpler, more cost effective, and secure manner than is typically done in conventional power management systems.

Example Machine Architecture

Figure 4:
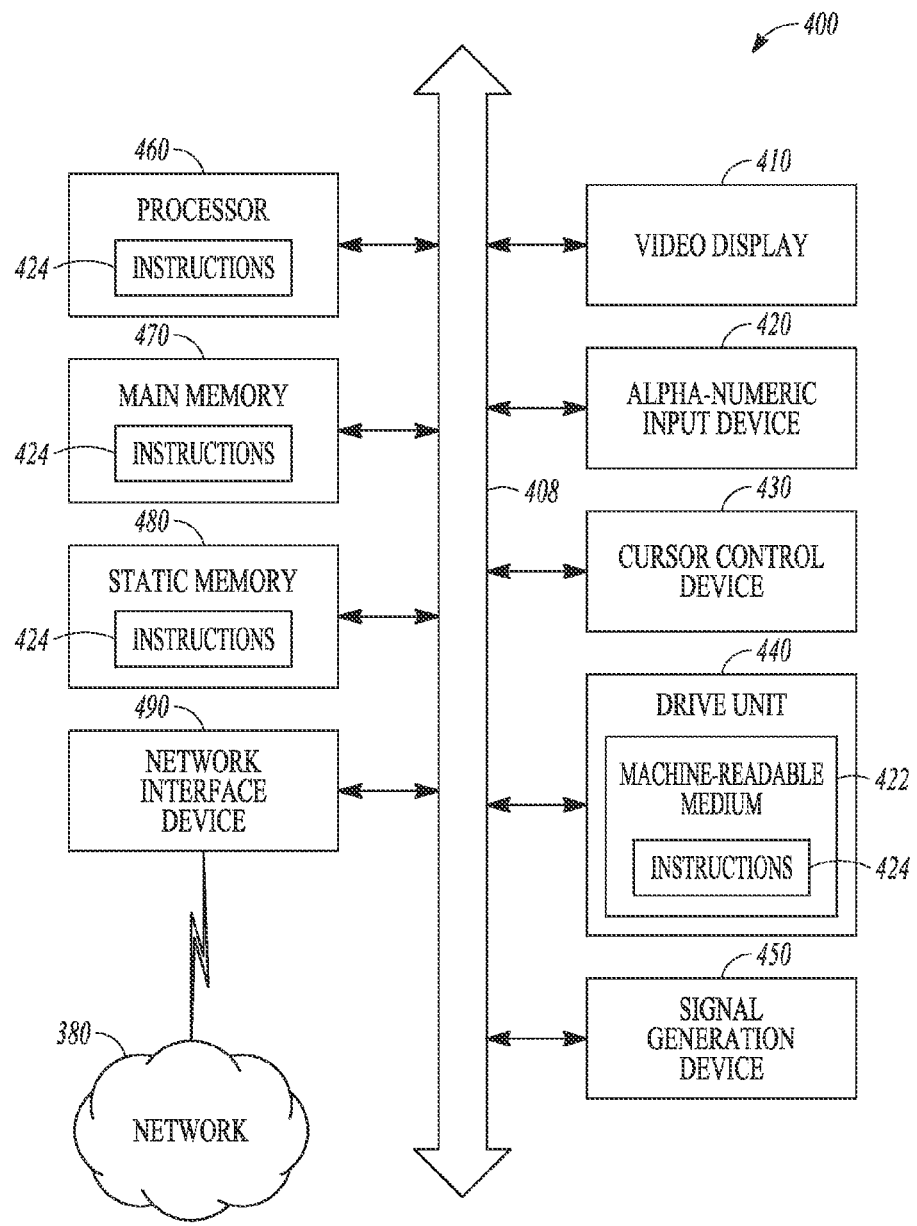
FIG. 4 is a block diagram that illustrates a diagrammatic representation of a machine in the example form of a computer system within which a set of instructions for causing the machine to perform any one or more of the methodologies discussed herein may be executed.

FIG. 4 is a block diagram that illustrates a diagrammatic representation of a machine in the example form of a computer system 400 within which a set of instructions for causing the machine to perform any one or more of the methodologies discussed herein may be executed. In some embodiments, the computer system 400 may operate in the capacity of a server or a client machine in a server-client network environment, or as a peer machine in a peer-to-peer (or distributed) network environment.

The computer system 400 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, white only a single machine is illustrated, the term "machine" shall also be taken to include any collection of machines that individually or jointly execute a set (or multiple sets) of instructions to perform any one or more of the methodologies discussed herein.

The example computer system 400 may include a processor 460 (e.g., a central processing unit (CPU), a graphics processing unit (GPU) or both), a main memory 470 and a static memory 480, all of which communicate with each other via a bus 408. The computer system 400 may further include a video display unit 410 (e.g., liquid crystal displays (LCD) or cathode ray tube (CRT)). The computer system 400 also may include an alphanumeric input device 420 (e.g., a keyboard), a cursor control device 430 (e.g., a mouse), a disk drive unit 440, a signal generation device 450 (e.g., a speaker), and a network interface device 490.

The disk drive unit 440 may include a machine-readable medium 422 on which is stored one or more sets of instructions (e.g., software 424) embodying any one or more of the methodologies or functions described herein. The software 424 may also reside, completely or at least partially, within the main memory 470 and/or within the processor 460 during execution thereof by the computer system 400, the main memory 470 and the processor 460 also constituting machine-readable media. It should be noted that the software 424 may further be transmitted or received over a network (e.g., network 380 in FIG. 3) via the network interface device 490.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of example embodiments described herein. The term "machine-readable medium" shall accordingly be taken to include, but not be limited to, solid-state memories and optical and magnetic media.

Thus, a computerized method and system are described herein. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of identifying electrical devices in a power management system comprising:
   accessing a generator controller that includes identifiers of the electrical devices directly, or using a server that also includes the identifiers of the electrical devices, wherein the generator controller is connected to the electrical devices;
   using the generator controller or the server to manually assign identifiers to the electrical devices and enter the assigned identifiers into a database on the generator controller or the server; and
   exchanging newly assigned data between the databases on the server and the generator controller to correlate the identifiers with the electrical devices in both the server and the generator controller.

2. The method of claim 1, further comprising storing data related to the identifiers in a database on the server.

3. The method of claim 2, further comprising storing data related to the identifiers in a database on the generator controller.

4. The method of claim 3, wherein exchanging data between the server and the generator controller to correlate identifiers with the electrical devices includes exchanging data when the server recognizes a change in the database on the generator controller.

5. The method of claim 3, wherein exchanging data between the server and the generator controller to correlate identifiers with the electrical devices includes exchanging data when the generator controller recognizes a change in the database on the server.

6. The method of claim 1, further comprising using an interface to correlate the identifiers with the electrical devices.

7. The method of claim 6, wherein using an interface to correlate the identifiers with the electrical devices includes displaying a list of identifiers for selection by a user.

8. The method of claim 7, wherein displaying a list of identifiers for selection by a user includes retrieving the list of identifiers from a database on the server.

9. The method of claim 6, wherein using an interface to correlate the identifiers with the electrical devices includes using a personal computer to correlate the identifiers with the electrical devices.

10. The method of claim 6, wherein using an interface to correlate the identifiers with the electrical devices includes using a portable electronic device to correlate the identifiers with the electrical devices.

11. The method of claim 10, wherein using a portable electronic device to correlate the identifiers with the electrical devices includes using a mobile phone to correlate the identifiers with the electrical devices.

12. The method of claim 1, wherein the electrical devices include electrical loads.

13. The method of claim 12, wherein the server includes identifiers of the electrical loads.

14. The method of claim 1, wherein the electrical devices include sensors such that the generator controller receives data from sensors.

15. The method of claim 14, wherein the server includes identifiers of the sensors that are connected to the generator controller.

16. The method of claim 15, wherein the electrical devices include at least one load switching and sensor module such that at least one of the sensors delivers signals to the load switching and sensor module, wherein the load switching and sensor module relays the signals to the generator controller, wherein the server includes identifiers of the load switching and sensor module.

17. The method of claim 1, wherein the identifiers include a written description of the electrical devices.

18. The method of claim 1, wherein the identifiers include an illustration of the electrical devices.

19. The method of claim 1, wherein the identifiers include an audio description of the electrical devices.

20. The method of claim 1, wherein the generator controller is a load control module that is configured to selectively operate electrical loads.

21. The method of claim 1, wherein accessing a generator controller using a server that includes identifiers of the electrical devices includes creating a connection between the server and generator controller.

22. The method of claim 21, wherein the generator controller stores a predetermined address of the server such that creating a connection between the server and generator controller includes using the generator controller to initiate the connection with the server at the predetermined address.

23. The method of claim 22, further comprising using an interface to correlate the identifiers with the electrical devices, wherein the interface stores a predetermined address of the server such that using the interface to correlate the identifiers with the electrical devices includes using the interface to initiate a connection with the server at the predetermined address.

24. The method of claim 21, wherein creating a connection between the server and generator controller includes using the interface to provide a serial number of the generator controller to the server.

25. The method of claim 24, wherein the server includes a mapping database that correlates the serial number of the generator controller with a network address of the generator controller.

26. A method of identifying electrical devices in a power management system comprising:
- accessing an automatic transfer switch using a server that includes identifiers of the electrical devices directly, or using a server that also includes the identifiers of the electrical devices, wherein the automatic transfer switch is connected to the electrical devices, wherein the automatic transfer switch is configured to switch between power sources;
- using the automatic transfer switch or the server to manually assign identifiers to the electrical devices and enter the assigned identifiers into a database on the generator controller or the server; and
- exchanging newly assigned data between the databases on the server and the automatic transfer switch to correlate the identifiers with the electrical devices in both the server and the automatic transfer switch.

* * * * *